United States Patent [19]

Palmer

[11] Patent Number: 5,597,011
[45] Date of Patent: Jan. 28, 1997

[54] FLOW REGULATOR

[76] Inventor: David W. Palmer, 200 Berkeley Rd., North Andover, Mass. 01845

[21] Appl. No.: 380,853

[22] Filed: Jan. 27, 1995

Related U.S. Application Data

[63] Continuation-in-part of Ser. No. 126,151, Sep. 23, 1993, Pat. No. 5,456,280, and Ser. No. 141,498, Oct. 22, 1993, Pat. No. 5,450,873, which is a continuation-in-part of Ser. No. 965,909, Oct. 23, 1992, abandoned, and Ser. No. 965,907, Oct. 23, 1992, Pat. No. 5,320,124, said Ser. No. 965,909, and Ser. No. 965,907, each is a continuation-in-part of Ser. No.850,767, Mar. 13, 1992, Pat. No. 5,251,654, Ser. No. 851,017, Mar. 13, 1992, Pat. No. 5,255,710, Ser. No. 852,084, Mar. 13, 1992, Pat. No. 5,255,709, and Ser. No. 851,016, Mar. 13, 1992, Pat. No. 5,220,940, said Ser. No. 850,767, Ser. No. 851,017, Ser. No. 852,084, and Ser. No. 851,016, each is a continuation-in-part of Ser. No.669,746, Mar. 15, 1991, abandoned, which is a continuation-in-part of Ser. No. 405,835, Sep. 11, 1989, Pat. No. 5,000,221, which is a continuation-in-part of Ser. No. 178,505, Apr. 7, 1988, abandoned.

[51] Int. Cl.$^6$ .................................................. G05D 7/01
[52] U.S. Cl. .......................... 137/497; 137/498; 137/599; 251/52
[58] Field of Search .................................. 137/497, 498, 137/500, 599, 514, 514.5; 251/50, 52, 54

[56] References Cited

U.S. PATENT DOCUMENTS

| 562,131 | 6/1896 | Gordon | 137/501 |
|---|---|---|---|
| 3,422,843 | 1/1969 | Blackman et al. | 137/514 |
| 3,853,143 | 12/1974 | DeLepeliere | 137/494 |
| 3,978,883 | 9/1976 | Petersen | 137/489.5 |
| 5,000,221 | 5/1991 | Palmer | 137/505 |
| 5,251,654 | 10/1993 | Palmer | 137/501 |
| 5,320,124 | 6/1994 | Palmer | 137/501 |

FOREIGN PATENT DOCUMENTS

| 0068917 | 1/1983 | European Pat. Off. . |
|---|---|---|
| 2349170 | 11/1977 | France . |
| 2216498 | 8/1974 | Germany . |
| 2309918 | 11/1976 | Germany . |
| 2389933 | 12/1978 | Germany . |
| 551043 | 5/1974 | Switzerland . |
| 2007335 | 5/1979 | United Kingdom . |

Primary Examiner—Stephen M. Hepperle
Attorney, Agent, or Firm—Bromberg & Sunstein

[57] ABSTRACT

A regulator including a movably, preferably hingedly, mounted member having a distal face, exposed to a reference pressure, and a frontal face, exposed to fluid passing through the regulator. Attached to the member is a structure that variably impedes fluid flowing through the regulator. The amount that this structure impedes the fluid flow varies as a function of the difference between the pressure of fluid on the frontal face of the member and the reference pressure. The impeder may be an integral part of the piston extending into the path of the fluid flowing through the regulator, or it may be a separate structure attached to the member. As the member moves in response to changes in pressure differential across the piston, each movable segment is displaced with respect to its corresponding fixed segment. As the corresponding segments are further displaced with respect to each other, the impedance to flow increases. A restoring force or torque exerts a force on the member so as to tend to lessen the resistance on the fluid flow, and so that when there is no flow through the passageway the resistance is relatively low. The member may be mounted at the top of the regulator in order to make the regulator easy to clean to clean and maintain. A dashpot may be included in the regulator so as to reduce high-frequency oscillations that may occur in a finely tuned regulator. The regulator may include a bypass channel that permits a portion of the flow to bypass the impeder. A variable throttle valve mounted in the bypass channel is used to adjust the effect of the bypass channel.

22 Claims, 5 Drawing Sheets

5,597,011

FLOW REGULATOR

DESCRIPTION

This application is a continuation-in-part of application Ser. No. 08/141,498, filed Oct. 22, 1993 now Pat. No. 5,450.873, which is a continuation-in-part of applications Ser. Nos. 07/965,909 (now abandoned) and 07/965,907 (now issued as U.S. Pat. No. 5,320,124), both of which were filed Oct. 23, 1992, and both of which are continuations-in-part of applications Ser. Nos. 07/850,767 (now issued as U.S. Pat. No. 5,251,654), 07/851,017 (now issued as U.S. Pat. No. 5,255,710), 07/852,084 (now issued as U.S. Pat. No. 5,255,709) and 07/851,016 (now issued as U.S. Pat. No. 5,220,940), all filed Mar. 13, 1992, and all of which are continuations-in-part of application Ser. No. 07/669,746, filed Mar. 15, 1991, now abandoned, and which is a continuation-in-part of application Ser. No. 07/405,835, filed Sep. 11, 1989 (now issued as U.S. Pat. No. 5,000,221), which is a continuation-in-part of application Ser. No. 07/178,505, filed Apr. 7, 1988, now abandoned. The present application is also a continuation-in-part of application Ser. No. 08/126,151, filed Sep. 23, 1993, now U.S. Pat. No. 5,456,280. All of these applications are hereby incorporated herein by reference.

TECHNICAL FIELD

This invention generally relates to a device for regulating the flow of a fluid, particularly a gas, through the device.

BACKGROUND ART

In heating, ventilating, and air conditioning (HVAC) systems and house exhaust systems, air flow is typically controlled using resistors to slow down the flow of air to and from different points in a building. When one resistor is adjusted, the pressure level throughout the system will change; any change in the system pressure will affect the flow of air past every other resistor. Thus, adjusting a resistor at one point causes "cross-talk" with resistors at other points.

One of the most complex problems confronted by the HVAC industry is controlling air flow through process rooms, such as the clean rooms used in semiconductor integrated-circuit chip manufacturing. Some air exits the process room through process equipment and other work stations with fume hoods. A partial vacuum is usually required in such equipment in order to ensure that noxious fumes do not leak from the process equipment or fume hoods and thereby endanger personnel working nearby. It is frequently important that a constant partial vacuum be maintained in, or a constant flow rate be maintained through, the process equipment in order to minimize defects in the integrated circuit chips being manufactured. The fumes from some process equipment may be prone to condense on regulators mounted between the process equipment and the house exhaust system. Regulators used in such situations must be frequently cleaned and maintained.

SUMMARY OF THE INVENTION

The present invention regulates a partial vacuum in a region, such as in a piece of process equipment or a fume hood. The partial vacuum may be with respect to the environment in which the equipment is located, so that the region's pressure is between the pressure of the environment and the pressure of the vacuum source to which the regulator is attached.

The regulator according to the present invention includes a hingedly mounted leaf-piston member having a distal face, exposed to a reference pressure, and a frontal face forming a portion of the conduit wall, the member being hingedly mounted about a pivot point. In a preferred embodiment, the distal face is on top and the frontal face on the bottom of the member. Attached to the member is a gate extending into the passageway so as to variably impede fluid flowing through the passageway at a constriction point. Preferably, the gate is in the form of a grate that is fixedly attached to the member at a point downstream from the pivot point. A fixed grate is mounted immediately adjacent the movable member's grate, so that the two grates form a plurality of constriction points. The gate's impedance on the fluid flow varies as a function of the pressure differential across the member's frontal and distal faces. The gate and the member are mounted so that each moves in a direction transverse to the direction of the fluid through the constriction point.

The regulator uses a restoring torque on the member around the pivot point tending to tend to cause the gate to lessen the impedance on the fluid flow, so that when there is no flow through the passageway the amount that the gate impedes the flow is relatively low. Preferably, the restoring torque is created by the weight of the member upstream of the pivot point. A counterweight may be used in order to create a large enough restoring torque. The counterweight may be mounted on a rail to permit the restoring torque to be easily modified.

To permit easy removal of the member and the gate, the member preferably has a downward-facing groove at the pivot point, so that the member can pivotally rest on a rod fixedly attached to the conduit at the pivot point.

To inhibit the member from vibrating, the regulator preferably includes a dashpot formed with a section of the member and a section of the conduit's fixed portion, the two sections being located immediately adjacent each other. The movable member's section of the dashpot and the fixed portion of the dashpot define a dashpot volume of fluid, which varies as the position of the member varies, but which is always substantially smaller than the volume of fluid in the conduit between the constriction point and the pivot point. The dashpot is preferably vented to the reference pressure and to the plenum.

One embodiment of the regulator includes a bypass channel, into which the gate does not extend, even when the gate is imparting the greatest impedance on the flow, so that a portion of the flow through the passageway bypasses the constriction points defined by the fixed and movable portions. This embodiment preferably includes a variable throttle valve for variably restricting the flow bypassing the constriction points defined by the fixed and movable portions of the impedance means.

DESCRIPTION OF SPECIFIC EMBODIMENTS

Figure 1:
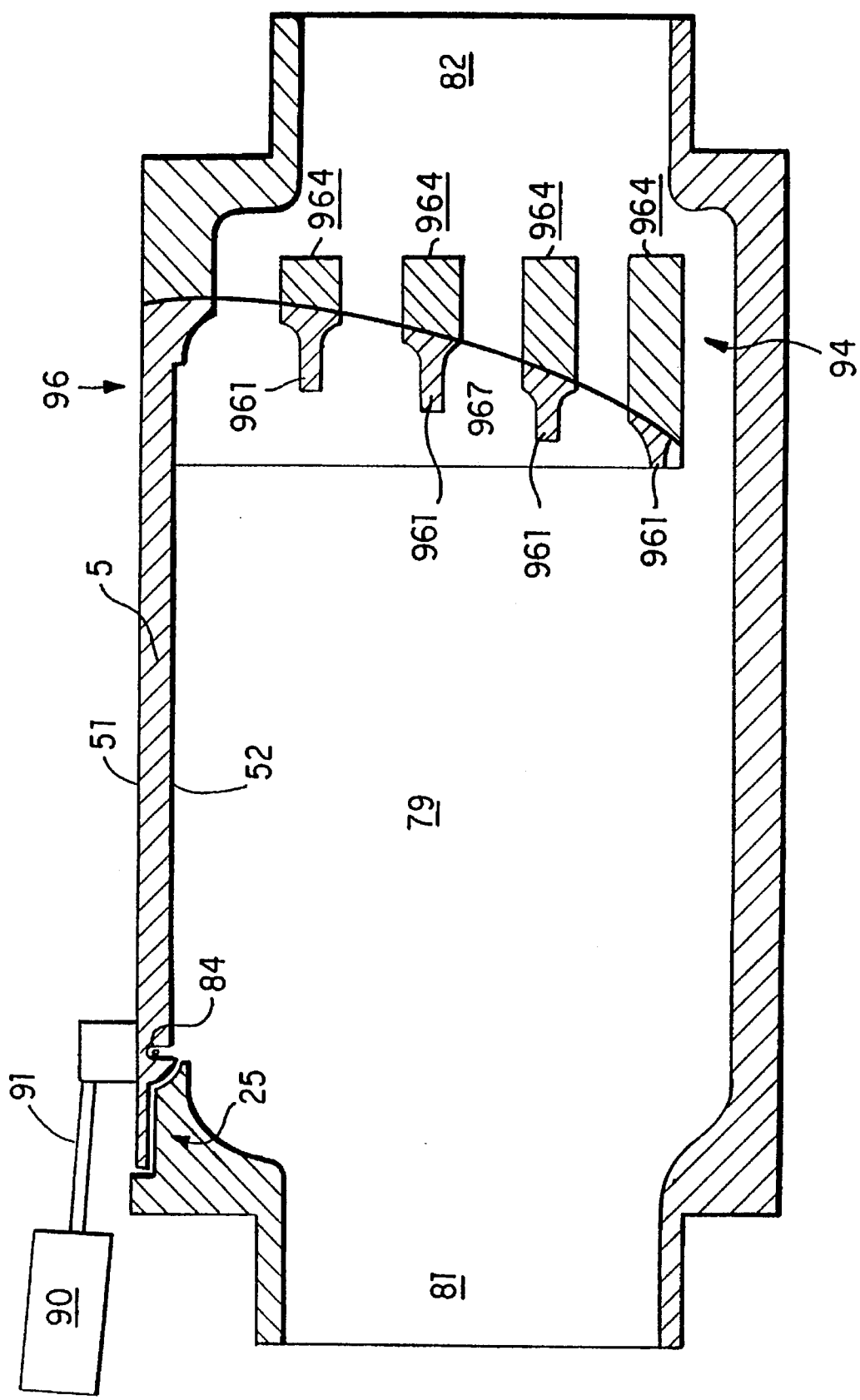
FIG. 1 shows a cross-section of a regulator according to the present invention with little or no flow passing through it.

FIG. 1 shows a preferred embodiment of the present invention. The regulator shown in FIG. 1 is similar in many respects to the regulator shown in FIG. 1 of U.S. Pat. No. 5,251,654, (which is referenced hereinabove). Like this earlier regulator, the leaf-piston member 5 is hingedly mounted, and variations in the pressure differential across the member—between the frontal face 52 and distal face 51—will tend to rotate the member 5 around the pivot point 84. The distal face 51 is preferably exposed to ambient pressure, and the regulator maintains a constant pressure differential between the ambient pressure (or whatever reference pressure is chosen) and the plenum 79, with the plenum pressure being less than the ambient (or reference) pressure.

The FIG. 1 regulator is particularly useful for maintaining a partial vacuum in process equipment, and this is accomplished by attaching the inlet 81 to the process equipment and attaching the outlet 82 of the regulator to a vacuum source. In a typical application, air flows from the environment in which the process equipment sits, into and through the process equipment, then through the regulator, and finally to the house exhaust system. The pressure in the environment, the air of which is substantially still, is exposed to the member's distal face 51 and thereby serves as the reference pressure.

The member 5 has a gate 96 attached to it. In the FIG. 1 embodiment, the gate 96 is a grate having a pair of arms 967 (only one of which is shown in the cross-section view of FIG. 1 ) extending downwardly and supporting the ends of the upstream crosspieces 961, which collectively form the movable grate. Each of the upstream crosspieces 961 has immediately adjacent to it a corresponding downstream crosspiece 964, which is connected to the sidewalls of the conduit. The downstream crosspieces 964 form the fixed grate 94, which cooperates with the movable grate 96 to form constriction points, through which the flow passes. These crosspieces perform the same function as the airfoil segments shown in FIGS. 5, 6, 7A and 7B of U.S. Pat. No. 5,251,654 (referenced hereinabove), and the grates shown in FIGS. 1 and 5 of U.S. Pat. No. 5,320,124 (referenced hereinabove); they create a variable impedance on the flow through the regulator. (Different arrangements of the grates are possible; for instance, the fixed grate 94 may be located upstream of the movable grate 96, although it will be appreciated that the arrangement shown in FIG. 1, with the fixed grate 96 located downstream and the movable grate located closer to the pivot point 84, is simpler to construct and disassemble.)

The member 5 is weighted so that, when there is little or no flow through the regulator, the gate 96 is pulled all the way up—as shown in FIG. 1—and causes the least impedance. In the preferred embodiment, this is accomplished by a counterweight 90 mounted on a rail 91, along which the counterweight can be moved. The counterweight 90 is mounted so that it applies a torque on the member 5 around the pivot point 84, opposite of and greater than the torque applied by the gate 96 and the rest of the member 5 to the right (as shown in the drawing) of the pivot point 84. Thus, the member 5 has a net torque rotating it into its position of least impedance (the member's highest position). This torque is called the restoring torque. The FIG. 1 regulator also includes a dashpot 25 located near the pivot point 84; the dashpot 25 is discussed in greater detail below.

Figure 2:
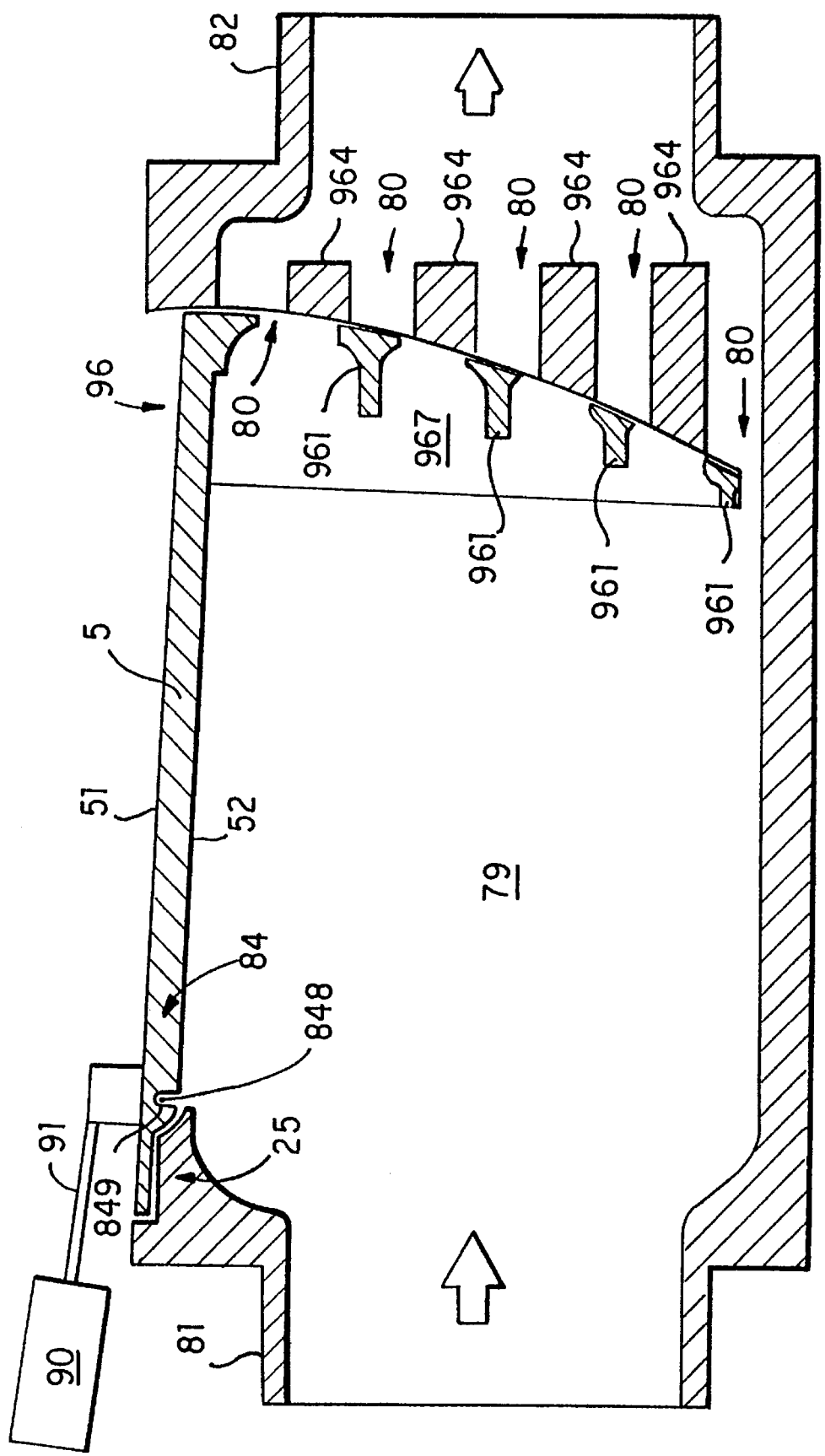
FIG. 2 shows a cross-section of the FIG. 1 regulator with sufficient flow to cause the piston member to pivot downward and increase the impedance on the flow through the regulator.

FIG. 2 shows the FIG. 1 regulator with sufficient vacuum being applied to its outlet 82 to cause the member 5 to rotate down, causing the upstream and downstream crosspieces, 961 and 964, to narrow the constriction points 80 and increase the impedance on the flow through the conduit. Because the torque being applied by the counterweight 90 is substantially constant and because the movable crosspieces 961 move transversely to the fluid flowing through the constriction points 80, the regulator is able to maintain a constant pressure differential between the reference pressure exerted on the member's distal face 51 and the plenum 79—once a sufficient vacuum is applied to the outlet 82 to cause the member to rotate downward, and until the vacuum at the outlet 82 becomes so great that the member 5 cannot rotate down any further. The traverse movement of the movable crosspieces 961 across the constriction points 80 prevents the movement of the member 5 from being directly affected by the pressure of the vacuum source, so that the regulator may maintain a constant partial vacuum in the plenum 79 despite variations in the strength of the vacuum source.

The torque created by the counterweight 90 can be modified by changing the position of the counterweight 90 along the rail 91. (Of course several counterweights may be used, and each may be mounted on a separate rail.) The further from the pivot point 848 that the counterweight 90 is positioned, the greater the torque rotating the member 5 upwardly and the greater the reference-/plenum-pressure differential maintained by the regulator. The constant pressure differential between the plenum 79 and the member's distal face 51 can be used to maintain a substantially constant partial vacuum in the process equipment to which the inlet 81 is attached, or to maintain a substantially constant flow rate through the device.

The member 5 rotates up and down in order to compensate for changes in the vacuum source pressure, as well as changes in the reference pressure against distal face 51 and changes in the restrictions on the flow from the environment, in which the process equipment sits, to the plenum. (An example of a change in the restriction on the flow from the environment to the plenum would be when the doors of the process equipment are opened and closed: opening the doors decreases the amount of restriction on the flow from the environment into the equipment and to the plenum; closing the doors increases the restriction on the flow from the environment into the equipment and the plenum.) In rotating up and down, the member 5 may become subject to harmonic oscillations, so in a preferred embodiment the regulator includes a dashpot 25 to reduce high-frequency oscillations. The dashpot 25 may be formed by sections of the member 5 and the fixed portion of the conduit. A similar dashpot design is shown in the embodiment depicted in FIGS. 3 and 4. As shown in FIG. 4, a section 92 of the member 5 and a section 42 of the fixed portion of the conduit together define a dashpot volume 29. The size of this volume 29 is a small fraction of the volume of the plenum 79, below the frontal face 52 of the member 5. Because of the small size of the dashpot volume 29, quick large changes in the position of the member 5—resulting from quick large changes reference-/plenum-pressure differential—would cause enormous changes in the pressure of the gas in the volume 29. Thus, the dashpot 25 tends to slow any quick large movements of the member 5. Slow changes in the position of the member 5—resulting from slow changes in the reference-/plenum-pressure differential—are not inhibited by the dashpot 25 because the gas in the dashpot volume 29 can slowly escape from or flow into the dashpot volume 29. The dashpot 25 is preferably vented at two locations, one location 26 leading into the reference chamber above the member's distal face 52, and the other location 27 leading into the plenum 79. By venting the dashpot volume 29 to the reference pressure and the plenum pressure, the effect of the dashpot 25 on the regulator's ability to maintain a constant pressure differential is minimized. (For example, it will be appreciated that if the dashpot volume were exposed to the pressure downstream of the gate—i.e., the vacuum-source pressure—the position of the member could be affected directly by the vacuum-source pressure.) The vents 26 and 27 to the dashpot should be very narrow in order to greatly inhibit the flow into and out the dashpot volume 29, without preventing flow into and out of the volume 29.

Figure 3:
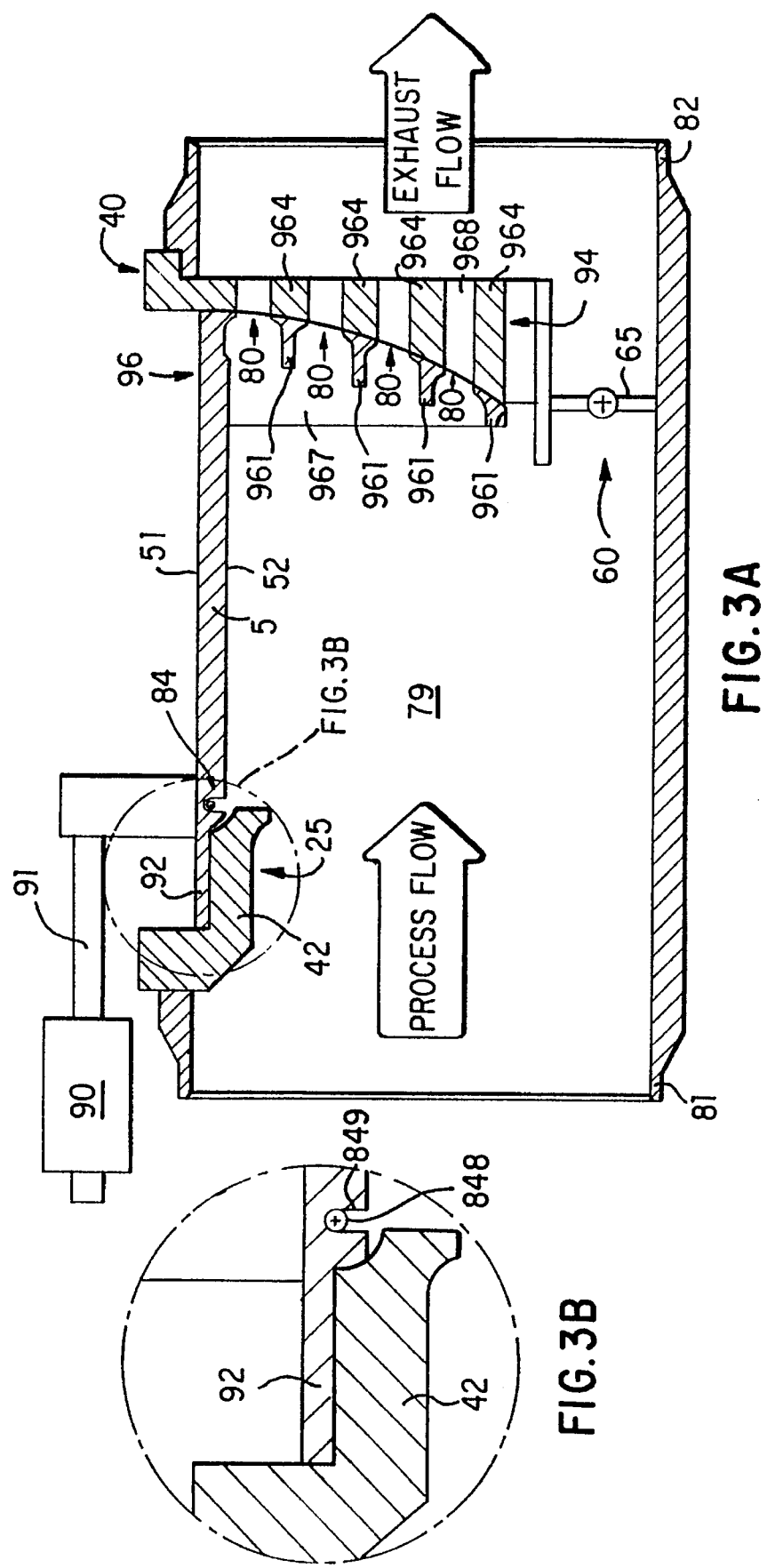
FIG. 3 shows a cross-section of an alternative embodiment of the regulator with a bypass throttle valve and with little or no flow passing through it.
Figure 4:
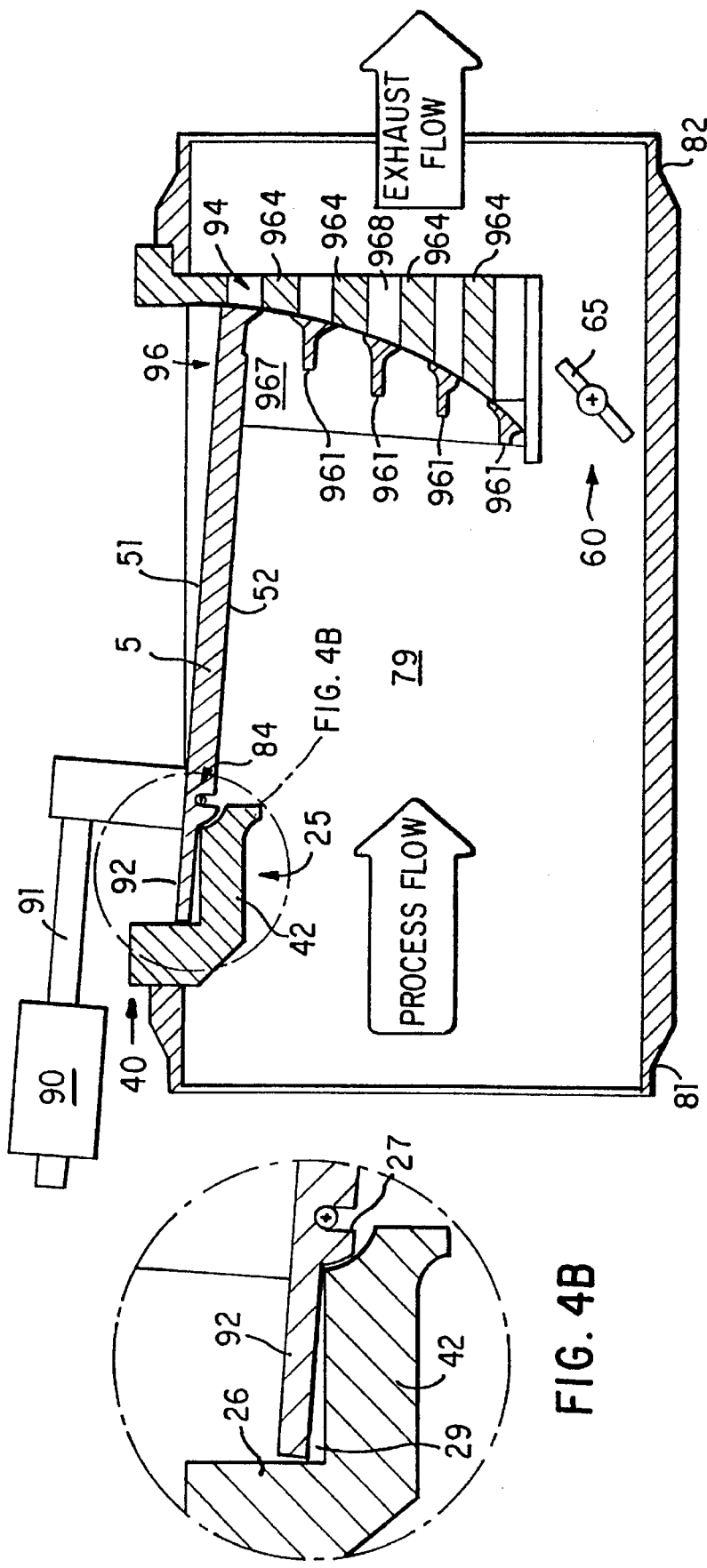
FIG. 4 shows a cross-section of the FIG. 3 embodiment with the bypass throttle valve adjusted and with a significant amount of flow passing through it.

The two depicted embodiments, one of which is shown in FIGS. 1 and 2, and the other of which is shown in FIGS. 3 and 4, have a design that is advantageous for use with "wet" process equipment, i.e., equipment which create fumes that may condense in the regulator. By mounting the piston member 5 at the top of the regulator, the bottom portion of the regulator may be made solid so that any condensation will be caught at the bottom of the regulator, from where it can be drained. (If the member 5 were mounted on the bottom of the regulator, condensation could seep through the gaps between the member 5 and the rest of the conduit walls.)

The design also allows the easy removal of the member/gate structure. The member 5 has a groove 849 at the location of the pivot point. The groove 849 rests on a rod 848 (preferably a teflon-coated rod to reduce friction) so that the member can rotate around the pivot point and so that the member/gate structure can be easily removed off of the rod 848. This arrangement permits easy access into the inside of the regulator so that the regulator's inside and in particular the movable crosspieces 961 can be easily cleaned. (Although in the preferred embodiments shown herein, the gate 96 is fixedly attached to, or is an integral portion of, the member, in alternative embodiments the gate may be hingedly attached to the member. Such an alternative structure makes the regulator somewhat more complicated to disassemble and to clean.)

The embodiment shown in FIGS. 3 and 4 also allows the removal of the fixed crosspieces 964, the pivot rod 848 and the fixed section 42 of the damper 92 so that these items may also be easily cleaned. The fixed portion of the conduit includes a removable portion 40 that can be unfastened and easily removed from the rest of the regulator. It will be appreciated that this embodiment permits the removal and replacement of the entire self-regulating portion of the device, i.e., the member 5, the counterweight 90 and its rail 91, the movable grate 96 (comprising the movable cross pieces 961 and the gate arms 967), the fixed grate 94 (comprising the fixed crosspieces 964 and the sidewalls 968 to which they are attached), the damper 25, and the pivot point 84. The easy-removal features of the embodiments shown in FIGS. 1–4 permit the important parts regulator to be replaced—while the parts are being repaired or cleaned, for instance—without having to shut down the process equipment for long periods.

The embodiment shown in FIGS. 3 and 4 includes a bypass channel 60 not found in the FIG. 1 embodiment. The bypass channel 60 preferably includes an adjustable throttle valve 65 to variably constrict the bypass channel 60. The bypass channel 60 permits some of the fluid flowing through the regulator to bypass the constriction points 80 formed by the fixed 94 and movable 96 grates. By opening up the bypass throttle valve 65, the desired plenum pressure (relative the reference pressure) can be reached more quickly. By closing the bypass throttle valve 65 (as shown in FIG. 3), the regulator of FIGS. 3 and 4 can be made to function like the non-bypass regulator shown in FIGS. 1 and 2.

Figure 5:
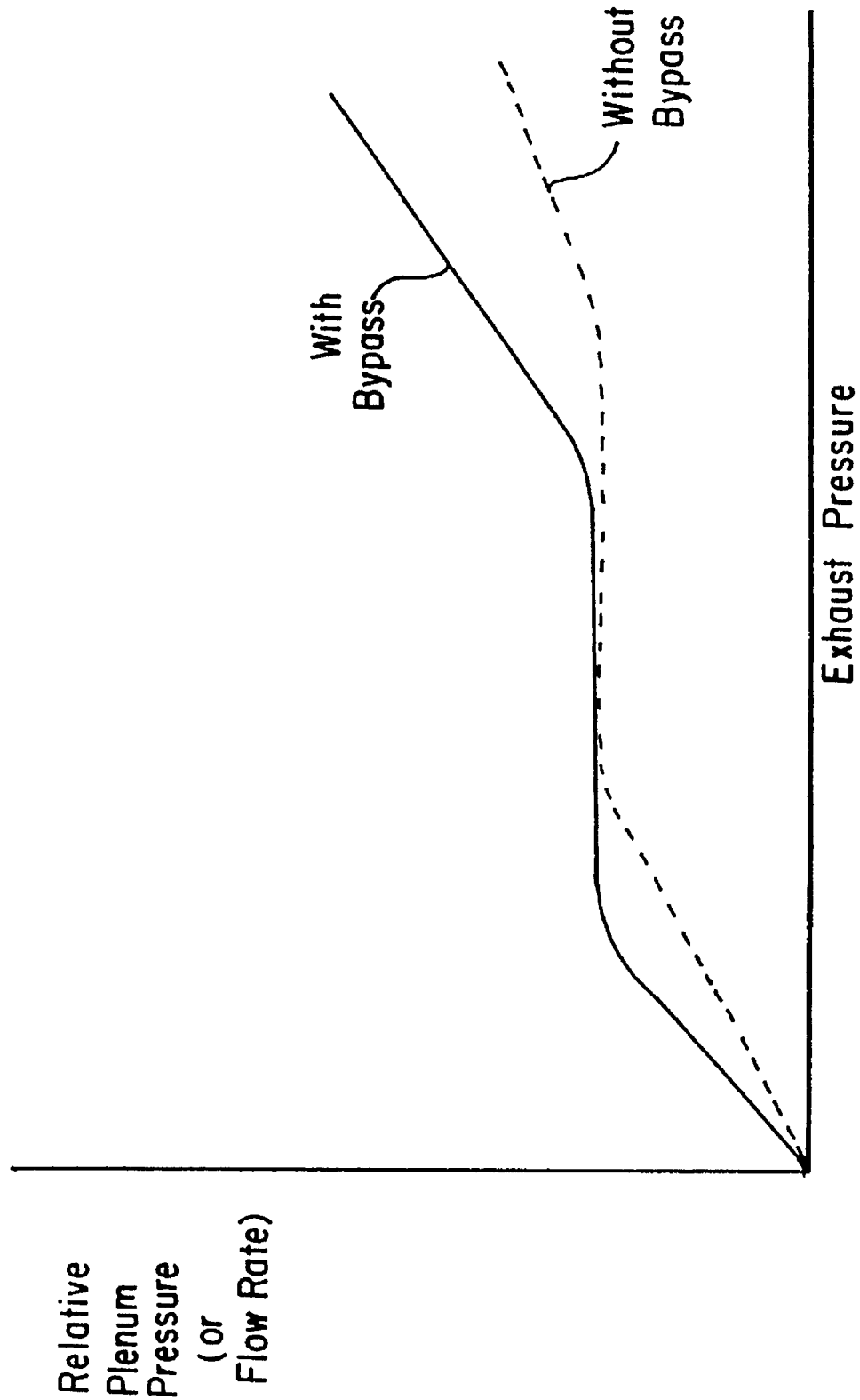
FIG. 5 is a graph representing how the flows through the FIGS. 1 and 3 embodiments are regulated.

FIG. 5 shows how the relative plenum vacuum strength (in, say, negative inches of water) varies with exhaust vacuum strength (in, say, negative inches of water, as well) in a regulator with a bypass and in a regulator without a bypass. In both cases, as the exhaust vacuum is turned on and increases in strength (i.e., as the exhaust pressure drops), the plenum vacuum also increases (i.e., the plenum pressure drops) until the vacuum in the plenum 79 is strong enough to overcome the torque applied by the counterweight 90 on the member 5, so as to cause the member 5 to rotate downwardly and narrow the constriction points 80. The narrowing of the constriction points 80 increases the impedance on the flow between the plenum 79 and the exhaust (at outlet 82). At this point, when the constriction points begin to narrow, a constant plenum vacuum (compared with the reference pressure) is maintained. Because the bypass version of the regulator has less impedance between the plenum 79 and the exhaust, the desired plenum vacuum is reached more quickly than the non-bypass version of the regulator.

Eventually, the exhaust vacuum strength will increase so much that the member 5 is pulled down all the way, so that the gate 96 can impede the flow no further. This point is reached in the bypass version of the regulator more quickly (i.e., at a lower exhaust vacuum strength) than in the non-bypass version of the regulator. Once the member 5 has moved down as much as possible, the plenum vacuum starts increasing in strength with the exhaust vacuum. Thus, it will be appreciated that opening the bypass throttle valve 65 causes the region that the regulator maintains a constant pressure—the flat plateau shown on the FIG. 5 graph—to move to lower exhaust vacuums; conversely, closing the bypass throttle valve 65 causes the region where constant plenum pressure is maintained to move to higher exhaust pressures. The throttle valve 65 may be adjusted accordingly to set the region of the constant plenum vacuum where (along the axis of increasing exhaust vacuum strength) it will be most beneficial for a given application. As noted above, the position (or the weight) of the counterweight 90 may be adjusted in order to adjust the desired constant pressure; the greater the torque created by the counterweight 90 the greater the pressure differential between the plenum 79 and the reference pressure applied against the member's distal face 51.

The new features disclosed herein—in particular, the dashpot 26 and the bypass channel—can be applied to regulators that regulate the flow from a fluid source to an environment such as that shown in FIG. 5 of U.S. Pat. No. 5,255,709 (referenced hereinabove). For instance, by connecting the right side of the FIG. 3 embodiment to an HVAC or other air source, adapting the member 5 (in particular the damper 25 end of the member) so that the member/gate structure can rotate up instead of down, and reversing the restoring torque, so as to cause the member 5 to be in its lowest position (and the position causing the least impedance) when there is no flow through the regulator. Such a regulator will maintain a pressure in its plenum that is a constant amount greater than (as opposed to less than, in the case of the FIG. 3 embodiment) the reference—or environment—pressure. Of course, the fixed section 42 of the dashpot 25 would have to be over the dashpot's movable section 92 to permit the member 5 to rotate properly, but the adapted dashpot could reduce vibration of the member in the manner discussed above. Likewise, the bypass throttle valve 65 could be adjusted to move the region over which the adapted regulator maintains a constant pressure.

Although the invention has been described with reference to several preferred embodiments, it will be understood by one of ordinary skill in the art that various modifications can be made without departing from the spirit and the scope of the invention, as set forth in the claims hereinbelow.

I claim:

1. A device for regulating the flow of fluid through a passageway, the device comprising:

a conduit having a wall defining the passageway through the device;

a member having a top face, exposed to a reference pressure, and a bottom face forming a portion of the conduit wall, the member being hingedly mounted about a pivot point, wherein the member includes a downward-facing groove at the pivot point, so that the member can pivotally rest on a rod fixedly attached to the conduit at the pivot point;

a gate attached to the member at a point downstream from the pivot point the gate extending into the passageway so as to variably impede fluid flowing through the passageway at a constriction point, the gate's impedance on the fluid flow varying as a function of the pressure differential across the member's top and bottom faces, the gate and the member being mounted so that each moves in a direction transverse to the direction of the fluid through the constriction point; and restoring means for exerting a torque on the member around the pivot point so as to tend to cause the gate to lessen the impedance on the fluid flow, and so that when there is no flow through the passageway the amount that the gate impedes the flow is relatively low, the restoring means including the weight of the member upstream of the pivot point.

2. A device according to claim 1, wherein the gate is fixedly attached to the member.

3. A device according to claim 2, wherein the gate includes a movable grate fixedly attached to the member so that it moves with the member, and wherein the conduit includes a fixed grate fixedly attached to the conduit so that the fixed grate does not move with respect to the conduit, the fixed and movable grates being located adjacent each other and defining a plurality of constriction points, the size of each constriction point varying as the member moves.

4. A device according to claim 3, wherein the member includes a counterweight movably mounted to the member with respect to the pivot point so as to permit adjustment of the torque exerted on the member.

5. A device for regulating the flow of fluid through a passageway, the device comprising:

a conduit having a wall defining the passageway through the device;

a member having a frontal face forming a movable portion of the conduit wall, wherein the conduit further includes a fixed portion, the member being hingedly mounted about a pivot point so that the member may pivot so as to narrow the path at a constriction point and variably impede flow through the passageway, the constriction point being spaced away from the pivot point; and a dashpot formed with a section of the member and a section of the conduit's fixed portion, the two sections being located adjacent each other so as to define a dashpot volume of fluid, the dashpot volume varying as the position of the member varies, but always being substantially smaller than the volume of fluid in the conduit between the constriction point and the pivot point, so that the dashpot inhibits vibration of the member.

6. A device according to claim 5, wherein the member has a distal face exposed to a reference pressure, and the dashpot is vented to the reference pressure.

7. A device according to claim 6, wherein the dashpot is also vented to the fluid adjacent the member's frontal face.

8. A device according to claim 7, further including a gate, attached to the member at a point downstream spaced from the pivot point, the gate extending into the passageway so as to variably impede fluid flowing through the passageway at the constriction point, the gate and the member being mounted so that each moves in a direction transverse to the direction of the fluid through the constriction point.

9. A device according to claim 5, further including a gate, attached to the member at a point downstream spaced from the pivot point, the gate extending into the passageway so as to variably impede fluid flowing through the passageway at the constriction point, the gate and the member being mounted so that each moves in a direction transverse to the direction of the fluid through the constriction point.

10. A device according to claim 9, wherein the gate includes a movable grate attached to the member so that it moves with the member, and wherein the conduit includes a fixed grate fixedly attached to the conduit so that the fixed grate does not move with respect to the conduit, the fixed and movable grates being located adjacent each other and defining a plurality of constriction points, the size of each constriction point varying as the member moves.

11. A device according to claim 9, wherein the gate is fixedly attached to the member.

12. A device according to claim 11, wherein the gate includes a movable grate fixedly attached to the member so that it moves with the member, and wherein the conduit includes a fixed grate fixedly attached to the conduit so that the fixed grate does not move with respect to the conduit, the fixed and movable grates being located adjacent each other and defining a plurality of constriction points, the size of each constriction point varying as the member moves.

13. A device for regulating the flow of fluid, the device comprising:

a conduit through which the fluid flows:

a member having a frontal face, exposed to fluid in the conduit, and a distal face exposed to a reference pressure, the member being hingedly mounted so as to rotate about a pivot point;

impedance means for variably impeding flow through the conduit at a constriction point, the size of the constriction point varying as the member moves the impedance means extending only part way into the passageway, so that a portion of the flow through the passageway bypasses the constriction point, wherein the impedance means includes movable and fixed portions, the fixed portion being fixedly attached to the conduit so that it does not move with respect to the conduit, the movable portion being attached to the member at a point other than the pivot point so that the movable portion moves as the member moves, the fixed and movable portions defining a plurality of constriction points, the size of each constriction point varying as the member moves, the impedance means extending only part way into the passageway, so that a portion of the flow through the passageway bypasses the constriction points defined by the fixed and movable portions:

restoring means for exerting a torque on the member about the pivot point so as to tend to lessen the impedance on the fluid flow and so that when there is no flow through the conduit the impedance caused by the impedance means is relatively low; and a variable throttle valve for variably restricting the flow bypassing the constriction points defined by the fixed and movable portions of the impedance means.

14. A device according to claim 13, wherein the movable portion is fixedly attached to the member.

15. A device according to claim 14, wherein the movable portion of the impedance means is attached to the member at a point downstream from the pivot point, and the restoring means includes the weight of the member upstream of the pivot point.

16. A device according to claim 15, wherein the member includes a counterweight movably mounted to the member with respect to the pivot point so as to permit adjustment of the torque exerted on the member.

17. A device according to claim 1, wherein the member includes a counterweight movably mounted to the member with respect to the pivot point so as to permit adjustment of the torque exerted on the member.

18. A device according to claim 17, wherein the gate includes a movable grate attached to the member so that it moves with the member, and wherein the conduit includes a fixed grate fixedly attached to the conduit so that the fixed grate does not move with respect to the conduit, the fixed and movable grates being located adjacent each other and defining a plurality of constriction points, the size of each constriction point varying as the member moves.

19. A device according to claim 17, wherein the gate includes a movable grate fixedly attached to the member so that it moves with the member, and wherein the conduit includes a fixed grate fixedly attached to the conduit so that the fixed grate does not move with respect to the conduit, the fixed and movable grates being located adjacent each other and defining a plurality of constriction points, the size of each constriction point varying as the member moves.

20. A device for regulating the flow of fluid, the device comprising:

a conduit through which the fluid flows;

a member having a frontal face, exposed to fluid in the conduit, and a distal face exposed to a reference pressure, the member being hingedly mounted so as to rotate about a pivot point;

impedance means for variably impeding flow through the conduit at a constriction point, the size of the constriction point varying as the member moves, the impedance means extending only part way into the passageway, so that a portion of the flow through the passageway bypasses the constriction point;

restoring means for exerting a torque on the member about the pivot point so as to tend to lessen the impedance on the fluid flow, and so that when there is no flow through the conduit the impedance caused by the impedance means is relatively low; and a variable throttle valve for variably restricting the flow bypassing the constriction point.

21. A device according to claim 20, wherein the impedance means is attached to the member at a point downstream from the pivot point, and the restoring means includes the weight of the member upstream of the pivot point.

22. A device according to the claim 21, wherein the member includes a counterweight movably mounted to the member with respect to the pivot point so as to permit adjustment of the torque exerted on the member.

* * * * *